US009467999B2

(12) United States Patent
Jindal et al.

(10) Patent No.: US 9,467,999 B2
(45) Date of Patent: Oct. 11, 2016

(54) BASE STATION CONFIGURATION USING MASSIVE MULTIPLE INPUT MULTIPLE OUTPUT (M-MIMO)

(71) Applicant: Broadcom Corporation, Irvine, CA (US)

(72) Inventors: Nihar Jindal, Mountain View, CA (US); Louay Jalloul, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 93 days.

(21) Appl. No.: 14/204,734

(22) Filed: Mar. 11, 2014

(65) Prior Publication Data
US 2014/0307818 A1   Oct. 16, 2014

Related U.S. Application Data

(60) Provisional application No. 61/811,563, filed on Apr. 12, 2013.

(51) Int. Cl.
| | |
|---|---|
| H04W 28/02 | (2009.01) |
| H04W 72/04 | (2009.01) |
| H04B 7/04 | (2006.01) |
| H04W 24/08 | (2009.01) |
| H04L 5/00 | (2006.01) |
| H04W 24/02 | (2009.01) |
| H04W 16/00 | (2009.01) |
| H04B 7/06 | (2006.01) |
| H04W 88/10 | (2009.01) |
| H04W 88/08 | (2009.01) |
| H04W 16/04 | (2009.01) |

(52) U.S. Cl.
CPC ....... *H04W 72/0433* (2013.01); *H04B 7/0413* (2013.01); *H04B 7/0452* (2013.01); *H04B 7/0617* (2013.01); *H04L 5/0092* (2013.01); *H04W 16/00* (2013.01); *H04W 24/02* (2013.01); *H04W 24/08* (2013.01); *H04W 28/0215* (2013.01); *H04W 72/04* (2013.01); *H04W 88/10* (2013.01); *H04L 5/0023* (2013.01); *H04L 5/0094* (2013.01); *H04W 16/04* (2013.01); *H04W 88/08* (2013.01)

(58) Field of Classification Search
None
See application file for complete search history.

(56) References Cited

U.S. PATENT DOCUMENTS

| | | | | |
|---|---|---|---|---|
| 6,091,954 | A * | 7/2000 | Haartsen | H04M 15/00 455/447 |
| 9,026,158 | B1 * | 5/2015 | Choi | H04W 4/12 455/507 |
| 2007/0249287 | A1 * | 10/2007 | Das | H04L 47/10 455/68 |
| 2009/0213825 | A1 * | 8/2009 | Gupta | H04W 48/02 370/338 |
| 2010/0149971 | A1 * | 6/2010 | Noriega | H04L 47/10 370/230 |
| 2013/0265955 | A1 * | 10/2013 | Kim | H04W 72/04 370/329 |
| 2013/0329695 | A1 * | 12/2013 | Senarath | H04W 36/18 370/331 |

* cited by examiner

*Primary Examiner* — Hassan Kizou
*Assistant Examiner* — Hashim Bhatti
(74) *Attorney, Agent, or Firm* — Sterne, Kessler, Goldstein & Fox P.L.L.C.

(57) ABSTRACT

Systems and methods for configuring base stations in a geographic region to handle specific respective types of data traffics are provided. The configuration of the base stations can be static, semi-static, or dynamic. User devices are associated with base stations based on their data traffic requirements. By configuring each base station for a particular traffic type, each base station can handle its corresponding traffic with lower complexity and using fewer resources.

20 Claims, 7 Drawing Sheets

BASE STATION CONFIGURATION USING MASSIVE MULTIPLE INPUT MULTIPLE OUTPUT (M-MIMO)

CROSS-REFERENCE TO RELATED APPLICATION(S)

The present application claims the benefit of U.S. Provisional Application No. 61/811,563, filed Apr. 12, 2013, which is incorporated herein by reference in its entirety.

BACKGROUND

1. Technical Field

The present disclosure relates generally to wireless networks supporting configuration of base stations, including the use of Massive Multiple Input Multiple Output (M-MIMO) radio access technologies (RATs) to enable base station configuration.

2. Background Art

In a Massive Multiple Input Multiple Output (M-MIMO) communication system, a transmitter, such as an Access Point (AP) or base station, is equipped with a very large number of transmit antennas (e.g., 32, 64, or 100) that can be used simultaneously for transmission to one or more receivers, such as a user equipment (UE).

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. Generally, the drawing in which an element first appears is typically indicated by the leftmost digit(s) in the corresponding reference number.

DETAILED DESCRIPTION OF EMBODIMENTS

For purposes of this discussion, the term "module" shall be understood to include at least one of software, firmware, and hardware (such as one or more circuits, microchips, processors, or devices, or any combination thereof), and any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

Figure 1:
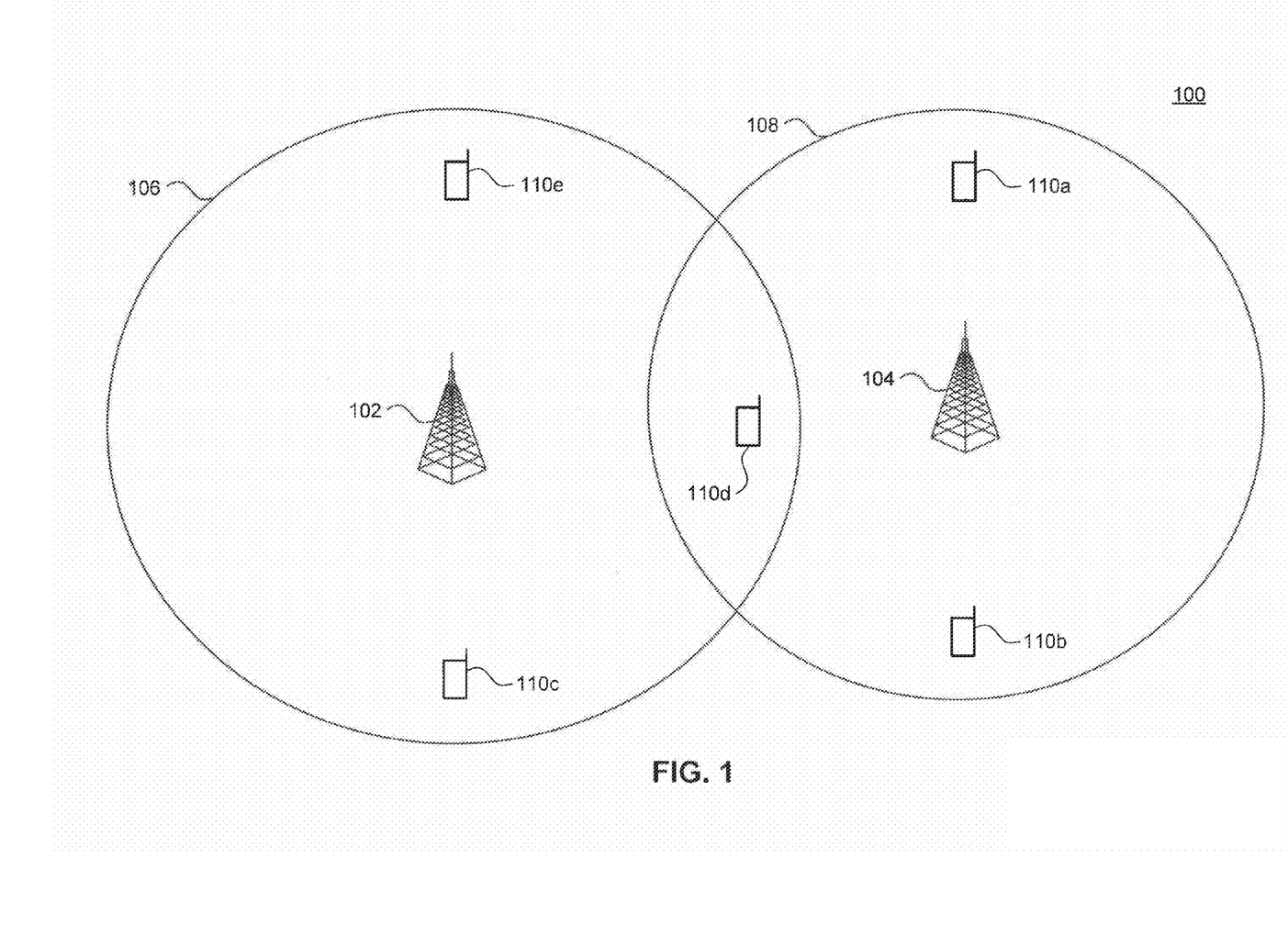
FIG. 1 illustrates an example environment in which embodiments can be implemented or practiced.

FIG. 1 illustrates an example environment 100 in which embodiments can be implemented or practiced. Example environment 100 is provided for the purpose of illustration only and is not limiting of embodiments. As shown in FIG. 1, example environment 100 includes a first base station 102, a second base station 104, and a plurality of user devices 110a, 110b, 110c, 110d, and 110e. As would be understood by a person of skill in the art based on the teachings herein, in other embodiments, example environment 100 can include more than two base stations and more or less than five user devices.

Base stations 102 and 104 can be Wireless Local Area Network (WLAN) APs, cellular network base stations, Bluetooth APs, or other wireless multi-access radio network base stations. Base stations 102 and 104 can be homogeneous (e.g., having same capabilities) or heterogeneous (e.g., having different capabilities). For example, base stations 102 and 104 can both be macrocell base stations serving respective cell areas. Alternatively, base station 102 can be a macrocell serving a corresponding cell area, and base station 104 can be a femtocell configured to serve a corresponding sub-cell area.

In an embodiment, base stations 102 and 104 use legacy radio access technologies (RATs) for transmission/reception and accordingly have respective coverage areas 106 and 108 respectively. As would be understood by 4 person of skill in the art, the illustration of coverage areas 106 and 108 as having circular shapes is done for simplification only. In practice, coverage areas 106 and 108, while generally circular or oval, can have non-uniform shapes. In example environment 100, coverage areas 106 and 108 overlap partially. In other embodiments, coverage areas 106 may fully overlap with one coverage area being fully encompassed by the other coverage area, or may not overlap at all.

User devices 110a-e can be WLAN user stations (STAs), cellular user equipments (UEs), Bluetooth devices, and/or other wireless radio devices. In an example embodiment, as shown in FIG. 1, user devices 110c, 110d, and 110e are located within coverage area 106 of base station 102, and user devices 110a, 110b, and 110d are located within coverage area 108 of base station 104. Generally, the location of a user device relative to nearby base stations governs the choice of which of the base stations acts as a primary serving base station for the user device. For example, because of their location within coverage area 106, user devices 110c and 110e are associated with and served by base station 102. Similarly, user devices 110a and 110b are associated with and served by base station 104 as a result of their presence within coverage area 108 of base station 104. User device 110d, which falls within an overlap region of coverage areas 106 and 108 can be served by either of base stations 102 and 104. For example, typically, user device 110d is served by the base station with the strongest signal measured at user device 110d.

Base stations 102 and 104 can be in communication with their respectively served user devices to support data traffics of varying characteristics (mixed data traffics). As used herein, mixed data traffics can refer to user data traffics that vary with respect to any traffic property. For example, base station 102 can be in communication with user device 110c to support a data traffic composed primarily of one or more long downlink bursts (e.g., average downlink burst size above a threshold, where herein a burst size can refer to the time duration or the number of consecutive frames that form the burst) from base station 102 to user device 110c. At the same, base station 102 can be in communication with user device 110e to support a data traffic composed primarily of short interleaved uplink and downlink bursts (e.g., average uplink/downlink burst size below a threshold) between base station 102 and user device 110e. In another example, base station 104 can be in communication with user device 110a to support a data traffic having a high uplink/downlink date rate and/or a low delay requirement, while at the same time supporting a low data rate and/or a high tolerable delay uplink/downlink data traffic with user device 110b.

Generally, mixed data traffics can be challenging to handle by the same base station. For example, data traffics having short and long downlink burst sizes can require significant processing resources to schedule efficiently by the base station. Likewise, data traffics with mixed data rate and/or delay requirements may require the base station to dynamically adjust transmission and/or reception parameters (e.g., transmit power, number of transmit/receive antennas, modulation and coding schemes, etc.) to meet the mixed traffic requirements. However, as mentioned above, because user devices are typically associated with base stations based on location, a base station is commonly required to handle such mixed data traffics.

Embodiments, as further described below, provide systems and methods for configuring base stations in a geographic region to handle specific respective types of data traffics. The configuration of the base stations can be static, semi-static, or dynamic. User devices are associated with base stations based on their data traffic requirements. By configuring each base station for a particular traffic type, each base station can handle its corresponding traffic with lower complexity and using fewer resources.

Figure 2:
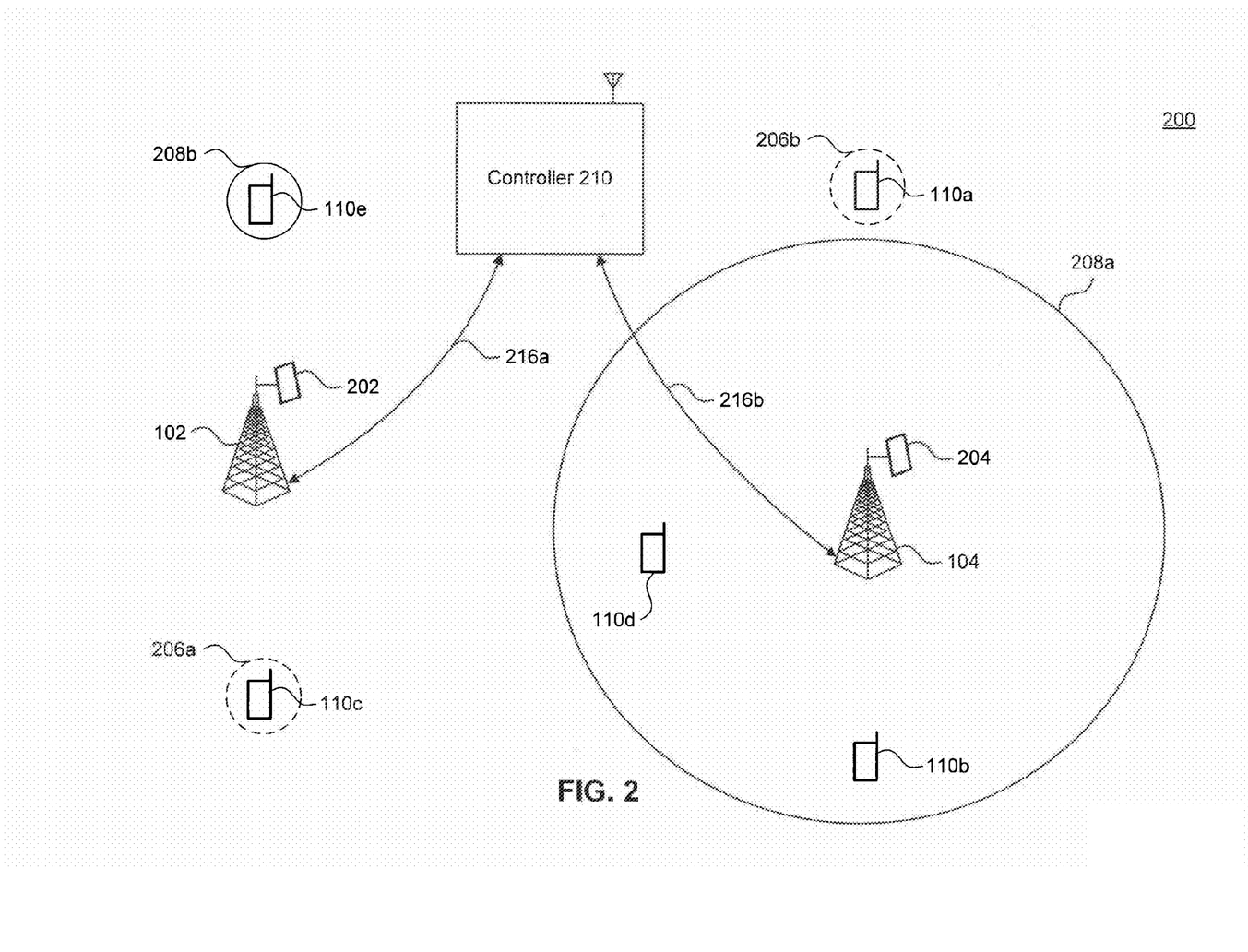
FIG. 2 illustrates another example environment in which embodiments can be implemented or practiced.

FIG. 2 illustrates another example environment 200 in which embodiments can be implemented or practiced. Example environment 200 is provided for the purpose of illustration only and is not limiting of embodiments. Like example environment 100, example environment 200 includes a first base station 102, a second base station 104, and a plurality of user devices 110a, 110b, 110c, 110d, and 110e. Additionally, example environment 200 includes a controller 210. Controller 210 is communicatively coupled to first and second base stations 102 and 104. For example, controller 210 can be coupled to first base stations 102 and 104 using backhaul links 216a and 216b respectively. Backhaul links 216a and 216b can be wired or wireless links. In another embodiment, controller 210 can be located in one of base stations 102 and 104. In an embodiment, controller 210 can include a processor and a memory for storing logic instructions. The logic instructions can be executed by the processor to perform the controller functions described herein.

In an embodiment, controller 210 is configured to monitor data traffic in the region corresponding to example environment 200. For example, controller 210 may monitor all uplink/downlink communications between base stations 102 and 104 and user devices 110a-e. In an embodiment, controller 210 monitors the data traffic by receiving traffic information from first and second base stations 102 and 104 via backhaul links 216a and 216b. Alternatively or additionally, controller 210 monitors the data traffic by eavesdropping on the communications between base stations 102 and 104 and user devices 110a-e. In an embodiment, the monitoring of the data traffic allows controller 210 to learn various characteristics of the data traffic, including various characteristics of individual uplink/downlink communications that form the data traffic.

In an embodiment, controller 210 uses the monitored data traffic to configure first and second base stations 102 and 104 statically or semi-statically. For example, in an embodiment, controller 210 performs a process such as example process 300 of FIG. 3. Example process 300 is provided for the purpose of illustration only and is not limiting of embodiments. As would be understood by a person of skill in the art, process 300 may be performed by an entity different than controller 210 in other embodiments.

Figure 3:
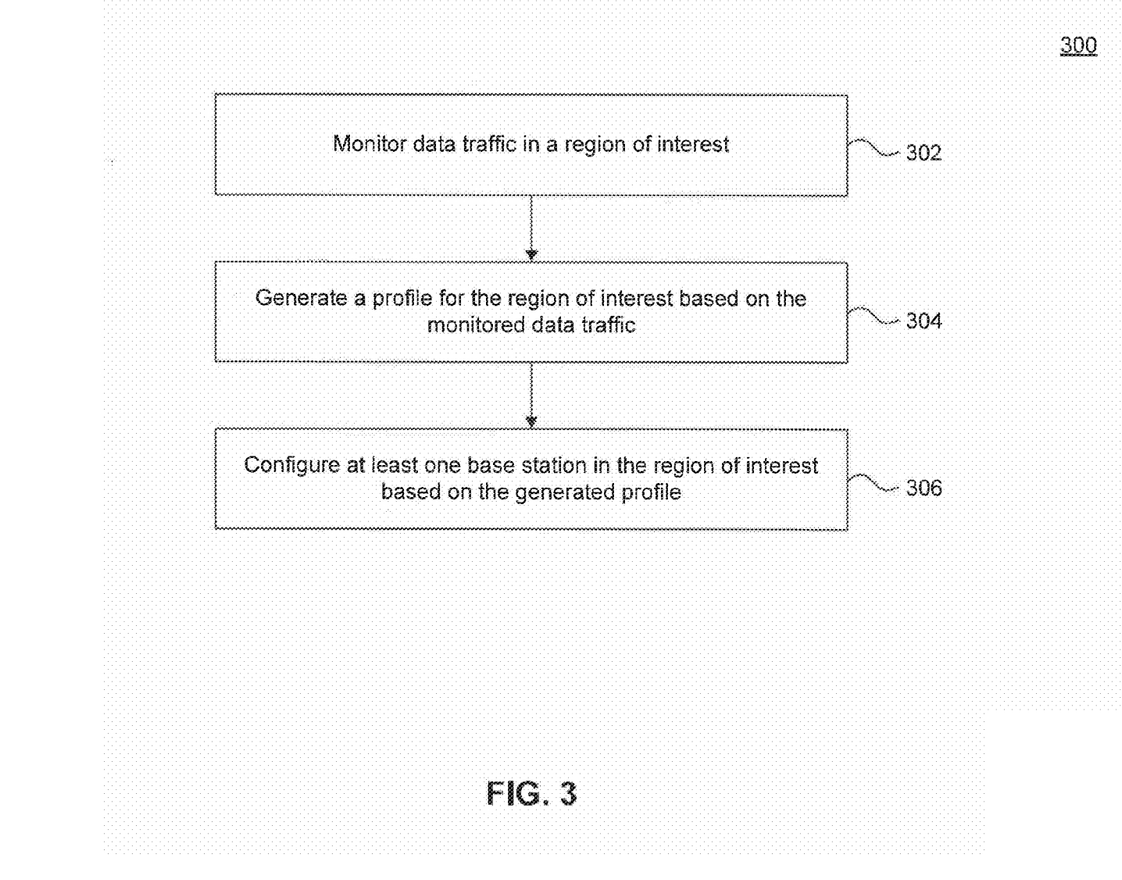
FIGS. 3-5 illustrate example processes according to embodiments.

As shown in FIG. 3, process 300 begins in step 302, which includes monitoring data traffic in a region of interest. With reference to example environment 100, the region of interest can correspond to the region spanned by coverage areas 106 and 108 of first and second base stations 102 and 104. The duration of the monitoring can be fixed or variable. For example, the monitoring may be performed over a number of months, weeks, days, or hours. Alternatively, the monitoring may be performed on specific days of the week (e.g., week days, weekends, etc.) or specific dates of the year (e.g., dates coinciding with particular events, holidays, etc.).

Subsequently, step 304 includes generating a profile for the region of interest based on the monitored data traffic. In an embodiment, the profile can include a characterization of the data traffic within the region with respect to one or more traffic properties (e.g., downlink burst size, desired data rate, tolerable delay, destination, etc.). According to embodiments, the profile can be generated offline or in real time for any time duration or specific time range for which corresponding monitored data traffic is available. For example, the profile can characterize the data traffic within the region on any given day using monitored data traffic corresponding to several days. Alternatively, the profile can characterize the data traffic within the region on a specific date of the year.

In an embodiment, the profile allows to identify mixed data traffics with respect to the one or more traffic properties within the region. In another embodiment, in addition to temporally characterizing the data traffic within the region, the profile can also characterize the data traffic geographically with respect to the one or more traffic properties. As such, the profile can indicate temporal and/or geographical variations in the data traffic with respect to the one or more traffic properties within the region of interest. For example, with reference to FIG. 2, a profile for the region corresponding to example environment 200 may show that the data traffic becomes less bursty in the downlink during later hours of the day. In another example, the profile may show that the data traffic becomes highly bursty in the downlink during a time of day and in a particular area of the region.

Process 300 terminates in step 306, which includes configuring at least one base station in the region of interest based on the generated profile. In an embodiment, step 306 includes configuring the at least one base station to handle a particular type of traffic with respect to one or more traffic properties, identified by the profile. For example, with reference to example environment 200, step 306 can include controller 210 configuring first base station 102 to handle data traffic having an average downlink burst size above a threshold and configuring second base station 104 to handle data traffic having an average downlink burst size below the threshold within the region corresponding to example environment 200. In another embodiment, step 306 can include controller 210 configuring first base station 102 to handle all broadcast traffic within example environment 200. In addition to the broadcast traffic, base station 102 may also handle unicast traffic in accordance with an association schedule as described below. In another embodiment, base station 102 only handles the broadcast traffic, and other base stations, such as base station 104, are configured to handle unicast traffic in accordance with the association schedule.

In an embodiment, the configuration of a base station, e.g., to handle a particular data traffic type can include adjusting transmit/receive parameters at the base station to improve/optimize the base station's performance for the particular data traffic. For example, if a base station is configured to handle traffic with long bursts, then the frame structure utilized by the base station can be adjusted to include additional setup/control overhead (e.g., pilots for channel estimation). In contrast, a base station configured for traffic with short bursts can use a frame structure with low setup/control overhead. In another embodiment, a base station configured for short burst traffic can use a random access scheme, whereby UEs can transmit to the base station whenever they have data available. As such, no scheduling is required for the uplink. For example, the UEs can transmit using a random backoff whenever data becomes available. Alternatively, the random access scheme is combined with spread spectrum (e.g., code division multiple access (CDMA)) to enable simultaneous transmission in the uplink by multiple UEs without data loss at the base station.

A consequence of this example configuration can be that first base station 102 serves user devices 110a and 110c and that second base station 104 serves user devices 110b, 110d, and 110e. In an embodiment, to effectuate this configuration, first and second base stations 102 and 104 may have to re-shape their respective coverage areas. For example, as shown in FIG. 2, the coverage area of first base station 102 may include areas 206a and 206b surrounding user devices 110a and 110c respectively. The coverage area of second base station 104 may include areas 208a and area 208b surrounding user device 110e. As further discussed below, this reshaping of the coverage areas of first and second base stations 102 and 104 can be enabled by the availability of Massive Multiple Input Multiple Output (M-MIMO) antenna arrays 202 and 204 at first and second base stations 102 and 104 respectively. The M-MIMO antenna arrays allow first and second base stations 102 and 104 to produce transmit/receive beam patterns that result in the desired coverage areas.

As mentioned above, in an embodiment, the profile for a region is associated with a respective time duration, and as such the configuration of first and second base stations 102 and 104 based on the profile can be for the same time duration. In another embodiment, base stations 102 and 104 can revert to a traditional configuration outside of this time duration, whereby base stations 102 and 104 serve user devices based on location.

Returning to FIG. 2, in another embodiment, controller 210 monitors data traffic in real time and dynamically configures first and second base stations 102 and 104 to serve user devices present within the monitored region. For example, in an embodiment, controller 210 performs a process such as example process 400 of FIG. 4. Example process 400 is provided for the purpose of illustration only and is not limiting of embodiments. As would be understood by a person of skill in the art, process 400 may be performed by an entity different than controller 210 in other embodiments.

Figure 4:
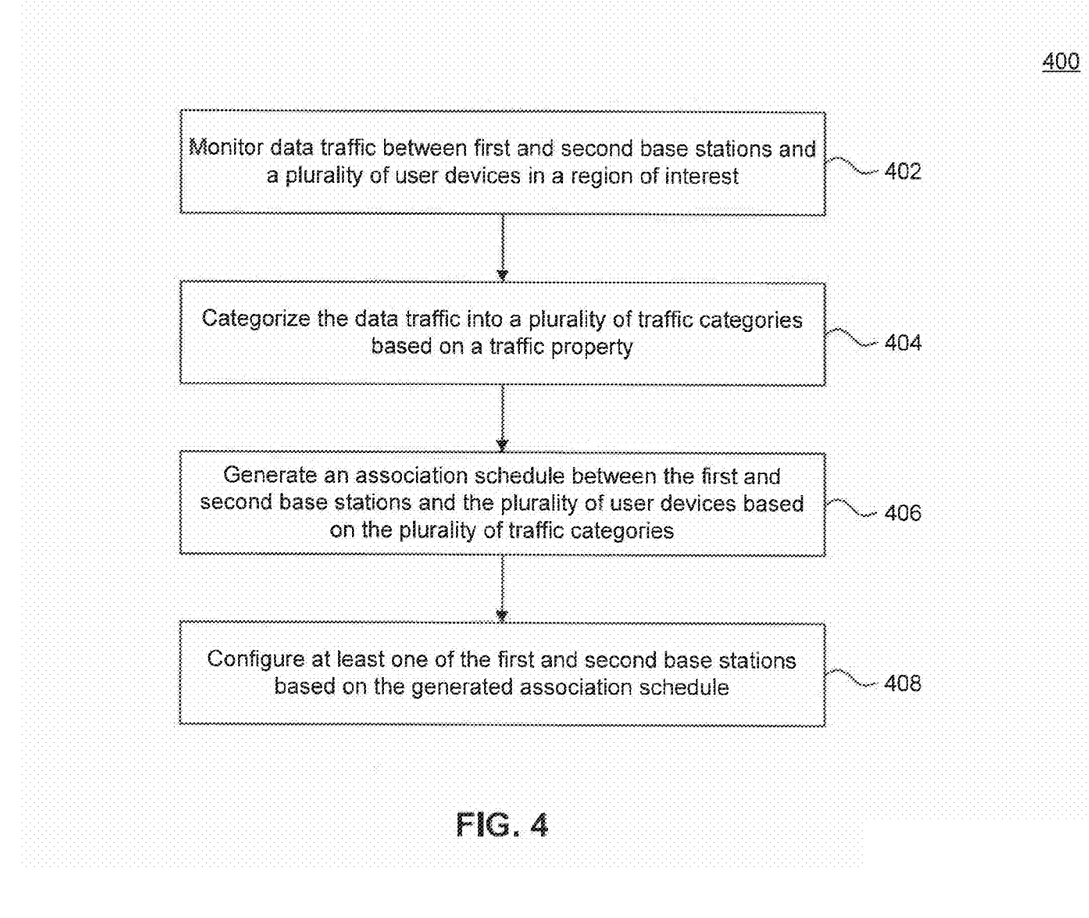

As shown in FIG. 4, process 400 begins in step 402, which includes monitoring data traffic between first and second base stations and a plurality of user devices in a region of interest. As would be understood by a person of skill in the art based on the teachings herein, in other embodiments, process 400 can be performed with respect to more than two base stations. For example, with reference to example environment 200, controller 210 may monitor all uplink/downlink communications between base stations 102 and 104 and user devices 110a-e. In an embodiment, controller 210 monitors the data traffic by receiving traffic information from first and second base stations 102 and 104 via backhaul links 216a and 216b. Alternatively or additionally, controller 210 monitors the data traffic by eavesdropping on the communications between base stations 102 and 104 and user devices 110a-e. In an embodiment, the monitoring of the data traffic allows controller 210 to learn various characteristics of the data traffic, including various characteristics of individual uplink/downlink communications that form the data traffic. In another embodiment, the monitoring of the data traffic allows controller 210 to learn the identities of the sources/destinations of individual uplink/downlink communications as well as the current geographic locations of user devices involved in the monitored communications. This allows the controller 210 to learn the characteristics of the data traffic on a per user device basis and on a per base station basis.

Process 400 then proceeds to step 404, which includes categorizing the data traffic into a plurality of traffic categories based on at least one traffic property. The traffic property can be any traffic property according to embodiments, including for example, uplink/downlink burst size, desired data rate, tolerable delay, Quality of Service (QoS) requirements, destination, etc. For instance, the traffic property may correspond to a downlink burst size, and controller 210 can categorize the data traffic into a plurality of traffic categories, including, for example, a first category corresponding to first downlink communications between the first and second base stations and a first set of the plurality of user devices having an average downlink burst size below a threshold, and a second category corresponding to second downlink communications between the first and second base stations and a second set of the plurality of user devices having an average downlink burst size above a threshold. With reference to example environment 200, the first set of user devices may include user devices 110b, 110d, and 110e and the second set of user devices may include user devices 110a and 110c, for example. In another example, the traffic property may correspond to the destination of the traffic, such as whether the traffic is broadcast (and/or multicast) or unicast. Controller 210 can thus categorize the traffic into a plurality of traffic categories, such as a broadcast traffic category and a unicast traffic category.

Then, in step 406, process 400 includes generating an association schedule between the first and second base stations and the plurality of user devices based at least in part on the plurality of traffic categories. In an embodiment, the association schedule indicates the user devices, if any, to be served by each of the first and second base stations. For example, referring to the example above with respect to environment 200, the association schedule may associate the first set of the plurality of user devices (e.g., user devices 110b, 110d, and 110e) with the first base station (e.g., base station 104) and the second set of the plurality of user devices (e.g., user devices 110a and 110c) with the second base station (e.g., base station 102).

In another embodiment, step 406 further includes determining the respective capabilities of the first and second base stations, and generating the association schedule based at least in part on the capabilities of the first and second base stations. The capabilities of the first and second base stations can include any capability that is relevant to enabling the association between the user devices and the first and second base stations in accordance with the association schedule. For example, without limitation, the capabilities determined in step 406 may include: presence or absence of a M-MIMO antenna array at the first and second base stations; capacity of a backhaul connection at the first and second base stations; and latency of the backhaul connection at the first and second base stations.

Process 400 terminates in step 408, which includes configuring at least one of the first and second base stations based on the association schedule. For example, referring to the example above with respect to environment 200, step 408 may include configuring the first base station (e.g., base station 104) to serve the first set of the plurality of user devices (e.g., user devices 110*b*, 110*d*, and 110*e*), and configuring the second base station (e.g., base station 102) to serve the second set of the plurality of user devices (e.g., user devices 110*a* and 110*c*).

In an embodiment, configuring a base station based on the association schedule includes sending the association schedule to the base station. In another embodiment, the configuration further includes sending a desired coverage area for the base station to effectuate the association schedule. The desired coverage area can be configured to accommodate both the serving of user devices associated with the base station and the reduction of interference due to the base station at other user devices served by other base stations. In a further embodiment, the configuration further includes determining transmit/receive parameters for the base station to enable the base station to effectuate the association schedule. Alternatively, the base station can determine the transmit/receive parameters without assistance from controller 210. In an embodiment, the configuration of a base station, e.g., to handle a particular association schedule can include adjusting the transmit/receive parameters at the base station to improve/optimize the base station's performance for the particular data traffic. For example, if a base station is configured to handle traffic with long bursts, then the frame structure utilized by the base station can be adjusted to include additional setup/control overhead (e.g., pilots for channel estimation). In contrast, a base station configured for traffic with short bursts can use a frame structure with low setup/control overhead. In another embodiment, a base station configured for short burst traffic can use a random access scheme, whereby UEs can transmit to the base station whenever they have data available. As such, no scheduling is required for the uplink. For example, the UEs can transmit using a random backoff whenever data becomes available. Alternatively, the random access scheme is combined with spread spectrum (e.g., code division multiple access (CDMA)) to enable simultaneous transmission in the uplink by multiple UEs without data loss at the base station.

Returning to FIG. 2, in another embodiment, controller 210 dynamically configures first and second base stations 102 and 104 to serve user devices present within the region corresponding to example environment 200 based on user tier information of the user devices. For example, in an embodiment, controller 210 performs a process such as example process 500 of FIG. 5. Example process 500 is provided for the purpose of illustration only and is not limiting of embodiments. As would be understood by a person of skill in the art, process 500 may be performed by an entity different than controller 210 in other embodiments.

Figure 5:
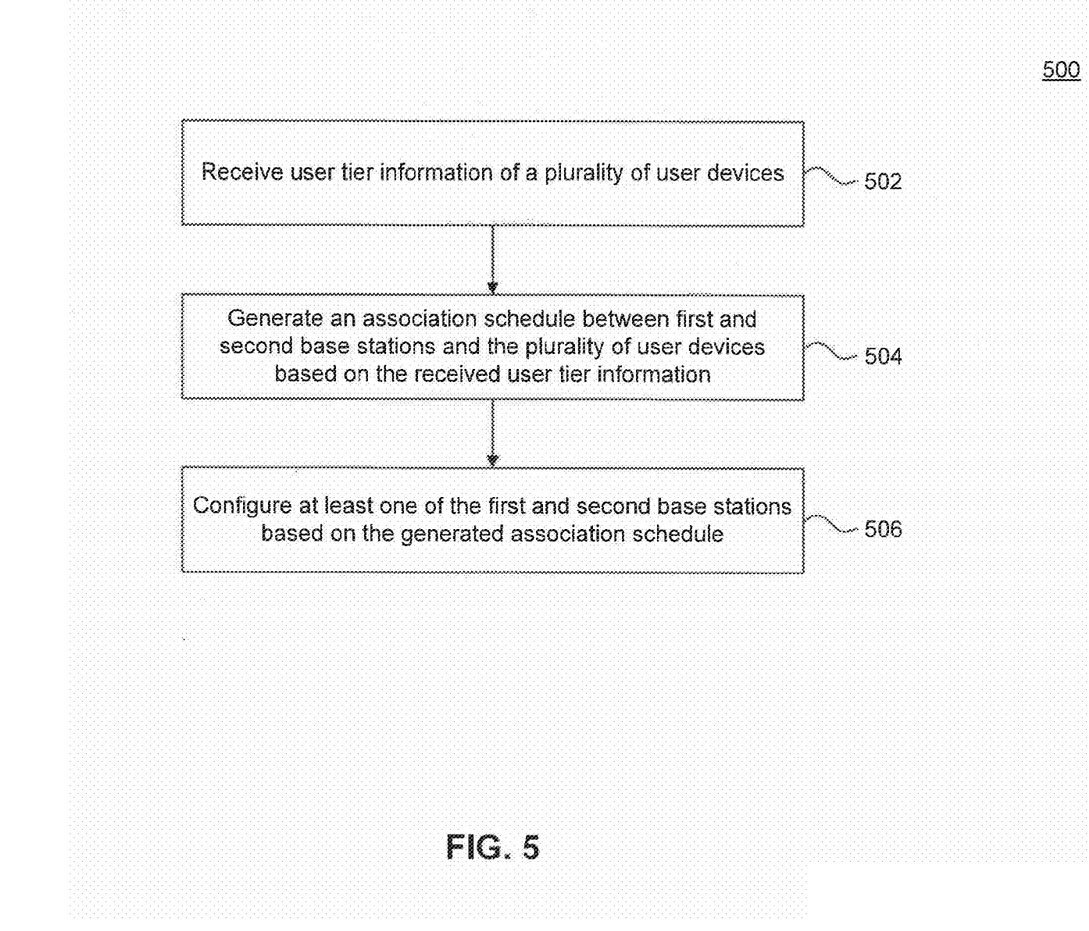

As shown in FIG. 5, process 500 begins in step 502, which includes receiving user tier information of a plurality of user devices in a region of interest. In an embodiment, the user tier information of a user device designates a class of service tier of the user device. For example, the user device may belong to one of a plurality of tiers (e.g., premium tier, regular tier, economy tier, etc.), each designating a respective class of service. In an embodiment, the user tier information is provided to controller 210 by the base stations. Alternatively, controller 210 can receive the user tier from another entity in the network.

Subsequently, process 500 proceeds to step 504, which includes generating an association schedule between first and second base stations in the region of interest and the plurality of user devices based at least in part on the user tier information. As would be understood by a person of skill in the art based on the teachings herein, in other embodiments, process 500 can be performed with respect to more than two base stations. In an embodiment, the association schedule indicates the user devices, if any, to be served by each of the first and second base stations. For example, referring to the example above with respect to environment 200, the association schedule may associate a first set of the plurality of user devices corresponding to a first tier with the first base station (e.g., base station 104) and a second set of the plurality of user devices corresponding to a second tier with the second base station (e.g., base station 102).

In another embodiment, step 504 further includes determining the respective capabilities of the first and second base stations, and generating the association schedule based at least in part on the capabilities of the first and second base stations. The capabilities of the first and second base stations can include any capability that is relevant to enabling the association between the user devices and the first and second base stations in accordance with the association schedule. For example, without limitation, the capabilities determined in step 504 may include: presence or absence of a M-MIMO antenna array at the first and second base stations; capacity of a backhaul connection at the first and second base stations; and latency of the backhaul connection at the first and second base stations. Generating the association schedule based on the capabilities of the first and second base stations allows for associating higher tier (e.g., premium) user devices with more capable base stations for better service.

Process 500 terminates in step 506, which includes configuring at least one of the first and second base stations based on the association schedule. For example, referring to the example above with respect to environment 200, step 506 may include configuring the first base station (e.g., base station 104) to serve the first set of the plurality of user devices corresponding to the first tier, and configuring the second base station (e.g., base station 102) to serve the second set of the plurality of user devices corresponding to the second tier.

In an embodiment, configuring a base station based on the association schedule includes sending the association schedule to the base station. In another embodiment, the configuration further includes sending a desired coverage area for the base station to effectuate the association schedule. The desired coverage area can be configured to accommodate both the serving of user devices associated with the base station and the reduction of interference due to the base station at other user devices served by other base stations. In a further embodiment, the configuration further includes determining transmit/receive parameters for the base station to enable the base station to effectuate the association schedule. For example, the configuration may include configuring the base station to serve its associated user devices using a M-MIMO RAT. Alternatively, the base station can determine the transmit/receive parameters without assistance from controller 210.

Figure 6:
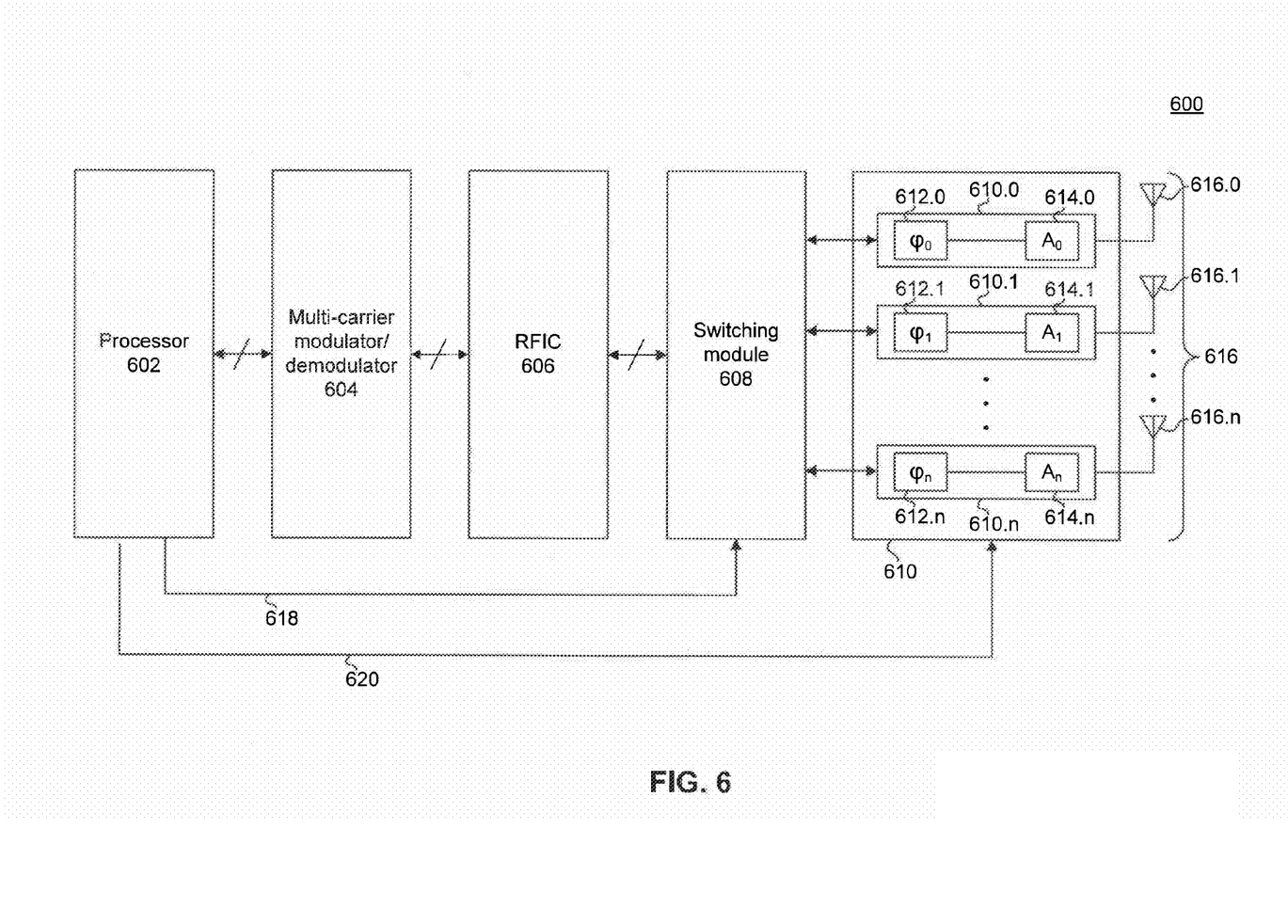
FIG. 6 illustrates an example base station according to an embodiment.

FIG. 6 illustrates an example base station 600 according to an embodiment. Example base station 600 is provided for the purpose of illustration only and is not limiting of embodiments. Example base station 600 may be an embodiment of base station 102 or base station 104. For the purpose of illustration only, example base station 600 is described as being an embodiment of first base station 102 serving user devices 110a and 110c in response to an association schedule from controller 210. As would be understood by a person of skill in the art based on the teachings herein, however, embodiments are not limited by this example scenario.

As shown in FIG. 6, example base station 600 includes, without limitation, a processor 602; a multi-carrier modulator/demodulator 604; a radio frequency integrated circuit (RFIC) 606; a switching module 608; an antenna array controller 610, comprising a plurality of antenna controllers 610.1, . . . , 610.n; and a M-MIMO antenna array 616, comprising a plurality of antenna elements 616.0, . . . , 616.n. In an embodiment, processor 602 includes an embedded memory for storing logic instructions that can be executed by processor 602 to perform the functions described herein. In another embodiment, the memory is external to processor 602.

In an embodiment, processor 602 includes a baseband processor which generates one or more (e.g., N) symbol streams (not shown in FIG. 6) for transmission by base station 600 over the same time and frequency resources. The symbol streams each typically comprise a sequence of modulated symbols. The symbol streams can be different from each other. Alternatively, some of the symbol streams can be duplicate.

The symbol streams are generally intended for one or more user devices (e.g., K UEs) served by base station 600. For example, referring to FIG. 1, the one or more user devices may be user devices 110a and 110c served by first base station 102. A user device served by base station 600 may be the intended recipient of one or more or none of the symbol streams transmitted by base station 600 at any given time. For example, referring to FIG. 1, user device 110a may be the intended recipient of a single symbol stream of the N symbol streams and accordingly is said to have a rank equal to 1. Alternatively, user device 110a may be the intended recipient of two symbol streams of the N symbol streams and accordingly is said to have a rank equal to 2. Symbol streams intended for user devices are referred to herein as user data symbol streams. User data symbol streams can include data and/or user-specific control information.

In an embodiment, processor 602 generates a first user data symbol stream for a first user device and a second user data symbol stream for a second user device, where the first and second user devices are indicated in an association schedule received by base station 600 from a controller. For example, referring to FIG. 1, the symbol streams can include a first user data symbol stream for user device 110a and a second user data symbol stream for user device 110c, associated with first base station 102 by the association schedule. As would be understood by a person of skilled in the art based on the teachings, the symbol streams can include any number of user data symbol streams intended for any number of user devices according to embodiments.

The first and second user data symbol streams are provided to multi-carrier modulator/demodulator 604. In an embodiment, multi-carrier modulator/demodulator 604 includes an Inverse Fast Fourier Transform (IFFT) module and a Fast Fourier Transform (FFT) module. Multi-carrier modulator/demodulator 604 modulates the symbol streams onto one or more physical resources of a multi-carrier frame (e.g., Orthogonal Frequency Division Multiplexing (OFDM) frame) at the control of processor 602. As understood by a person of skill in the art, a multi-carrier frame, such as an OFDM frame, corresponds to a grid of physical resources, with each physical resource being associated with a respective time slot (or symbol) and frequency sub-carrier of the multi-carrier frame. In an embodiment, the first and second user data symbol streams are modulated onto different physical resources of the multi-carrier frame. As such, the first and second user data symbol streams occupy different time slots (symbols) and/or frequency subcarriers of the multi-carrier frame. This means that the first and second user data symbol streams are transmitted over orthogonal physical resources in time and/or frequency.

In another embodiment, the first and second user data symbol streams are modulated onto the same time and frequency physical resources of the multi-carrier frame, but are pre-coded in such a manner that they are transmitted on spatially orthogonal paths by M-MIMO antenna array 616. As further described below, in embodiments, the pre-coding can be performed by applying a transmit precoder matrix to the symbol streams before multi-carrier modulation and/or by applying a transmit weight vector to the antenna signals prior to transmission. In the former case, the pre-coding can be performed on a physical resource basis, a sub-carrier basis, or a timeslot basis (e.g., OFDM symbol basis). In the latter case, the pre-coding is applied in the time domain on a multi-carrier modulated signal.

In an embodiment, processor 602 selects a subset of M-MIMO antenna array 616 (which can be the entire M-MIMO antenna array 616) for transmitting the first and second user data symbol streams. Based on the size of the selected subset of M-MIMO antenna array 616 and the number of symbol streams being transmitted (two in this example), processor 602 determines a transmit precoder matrix for pre-coding the first and second user data symbol streams. For example, assume that the selected subset of M-MIMO antenna array 616 includes 16 elements, then processor 602 determines the transmit precoder matrix to be of size 16×2. In an embodiment, the transmit precoder matrix depends on the geometry of the selected subset such that a desired transmit beam pattern is produced from the precoding. As mentioned above, the desired transmit beam pattern may be based on a desired coverage area of base station 600.

Processor 602 then pre-codes the first and second user data symbol streams using the transmit precoder matrix to generate a plurality of signals. In the example described above, pre-coding the first and second user data symbol streams using a 16×2 transmit precoder matrix results in 16 signals. Depending on the actual values of the transmit precoder matrix, the plurality of signals can each correspond to an amplitude and/or phase adjusted version of a single symbol stream (i.e., the first user data symbol stream or the second user data symbol stream), or one or more of the plurality of signals can be a weighted combination of the first and second user data symbol streams.

In an embodiment, processor 602 is configured to determine the transmit precoder matrix based on one or more of: a first channel estimate of a first downlink channel from base station 600 to user device 110a, and a second channel estimate of a second downlink channel from base station 600 to user device 110c. In an embodiment, processor 602 determines the first and second channel estimates from pilots transmitted by user devices 110a and 110c.

In another embodiment, processor 602 determines the transmit precoder matrix such that transmission of the plurality of signals by M-MIMO antenna array 616 results in the first user data symbol stream being beamformed to user device 110a and the second user data symbol stream being beamformed to user device 110c. This results in a coverage area of base station 102 that includes (or consists of) areas 206a and 206b surrounding user devices 110a and 110c respectively, as shown in FIG. 2.

In an embodiment, processor 602 forms a concatenated down link channel estimate that includes as its elements the first channel estimate from base station 600 to user device 110a and the second channel estimate from base station 600 to user device 110c. Processor 602 then determines the transmit precoder matrix based on the concatenated downlink channel. In an embodiment, processor 602 determines or selects the transmit precoder matrix such that when multiplied by the concatenated downlink channel results in a diagonal matrix. This effectively creates spatially orthogonal downlink paths from the selected subset of M-MIMO antenna array 616 to user devices 110a and 110c, so that interference between the two channels is reduced or even eliminated.

In another embodiment, processor 602 can select the transmit precoder matrix to ensure no or minimal interference within a coverage area of a neighboring base station and/or at select user devices served by the neighboring base station. For example, processor 602 can select the transmit precoder such that a transmit beam pattern of base station 102 creates a spatial null within or over the entire coverage area of base station 104. This may include creating a spatial null in area 208b surrounding user device 110e served by base station 104. Depending on whether the spatial null is partial or full, transmissions by base station 102 may have reduced or even zero power within the coverage area of base station 104, causing minimal or no interference. In an embodiment, processor 602 can select the transmit precoder matrix such that the spatial null is constantly created within or over the coverage area of base station 104. In another embodiment, processor 602 can vary the transmit precoder matrix to selectively create spatial nulls within or over the entire coverage area of base station 104.

In an embodiment, to create a spatial null within the coverage area of a neighboring base station, the downlink channel from base station 600 to the coverage area of the neighboring base station is characterized. For example, pilot signals can be transmitted from different locations of the coverage area, including from the neighboring base station itself and/or any user devices within the coverage area. The pilot signals are received by base station 600 and processed to determine an uplink channel estimate from the coverage area to base station 600. The downlink channel can be estimated from the uplink channel by reciprocity. Alternatively, base station 600 can transmit downlink pilots to user devices located in the coverage area (including the neighboring base station) and receive channel feedback from those devices to determine the downlink channel. Once the downlink channel is obtained, processor 602 can determine the transmit precoder matrix based additionally on this downlink channel such that the transmit beam pattern of base station 102 creates a spatial null within or over the entire coverage area of base station 104. Creating a spatial null at a select user device served by base station 104 can be achieved in a similar fashion by obtaining a channel estimate of a downlink channel to the user device.

The plurality of signals resulting from the pre-coding of the first and second user data symbol streams are provided by processor 602 to multi-carrier modulator/demodulator 604. In an embodiment, multi-carrier modulator/demodulator 604 modulates the plurality of signals onto the same time and frequency resources. This is equivalent to having multiple parallel (time and frequency synchronized) OFDM frames, with each signal of the plurality of signals being mapped to one of the multiple parallel OFDM frames such that all signals occupy in their respective OFDM frames the same time and frequency resources.

The plurality of signals modulated by multi-carrier modulator/demodulator 604 are then provided to RFIC 606. RFIC 606 includes analog components such as filters, frequency up-converters, and power amplifiers. RFIC 606 acts on the plurality of signals to generate a respective plurality of carrier-modulated signals. The plurality of carrier-modulated signals are then provided to switching module 608. Switching module 608 is controllable by processor 602 by means of a control signal 618 to couple the plurality of carrier-modulated signals to M-MIMO antenna array 616. In an embodiment, processor 602 controls switching module 608 to couple the plurality of carrier-modulated signals to respective antenna elements of the selected subset of M-MIMO antenna array 616. In an embodiment, switching module 608 couples the plurality of carrier-modulated signals to M-MIMO antenna array 616 via antenna array controller 610 as further described below.

Antenna array controller 610 is coupled between switching module 608 and M-MIMO antenna array 616. In an embodiment, antenna array controller 610 includes a plurality of antenna controllers 610.0, 610.1, . . . , 610.n that correspond respectively to antenna elements 616.0, 616.1, . . . , 616.n of M-MIMO antenna array 616. In an embodiment, each antenna controller 610.0, 610.1, . . . , 610.n includes a respective phase controller 612 and a respective amplitude controller 614. Antenna array controller 610 can be implemented using digital and/or analog components.

In an embodiment, processor 602 controls antenna array controller 610 by means of a control signal 620. In another embodiment, processor 602 controls antenna array controller 610 using, control signal 620 to activate one or more of antenna controllers 610.0, 610.1, . . . , 610.n depending on which of antenna elements 616.0, 616.1, . . . , 616.n is being used for transmission or reception. In an embodiment, when an antenna element 616.0, 616.1, . . . , 616.n is used for transmission or reception, its corresponding antenna controller 610.0, 610.1, . . . , 610.n is active. A phase shift can be applied to a signal being transmitted or received by an antenna element 616.0, 616.1, . . . , 616.n using its respective phase controller 612.0, 612.1, . . . , 612.n. An amplitude amplification/attenuation can be applied to a signal being transmitted or received using an antenna element 616.0, 616.1, . . . , 616.n using its respective amplitude controller 614.0, 614.1, . . . , 614.n. In an embodiment, the phase shift and amplitude amplification/attenuation are applied in the time domain to the signal.

In an embodiment, processor 602 determines, based on one or more of: the desired transmit beam pattern, the downlink channel (e.g., the concatenated downlink channel), the transmit precoder matrix, and the selected subset of antenna elements used for transmission, a transmit weight vector for antenna array controller 610. In an embodiment, the transmit weight vector includes a complex element for each antenna controller 610.0, 610.1, . . . , 610.n, which determines the respective phase shift and amplitude amplification/attenuation to be applied by the antenna controller to the signal being transmitted by its respective antenna element. Hence, as described above, antenna array controller 610 provides an additional layer for shaping the transmit beam pattern of M-MIMO antenna array 616, and can be used with or without the above described symbol stream precoding to realize a desired transmit beam pattern using M-MIMO antenna array 616. The desired transmit beam pattern can be, as described above, such that the first and second user data symbol streams are beamformed to user devices 110a and 110c respectively, with a spatial null created at another user device (e.g., user device 110e) served by base station 104.

After processing by antenna array controller 610, the plurality of carrier-modulated signals are coupled to respective antenna elements of the selected subset of M-MIMO antenna array 616 and are transmitted. In an embodiment, the selected subset of M-MIMO antenna array transmits the plurality of carrier-modulated signals on the same time and frequency physical resources as described above.

Figure 7:
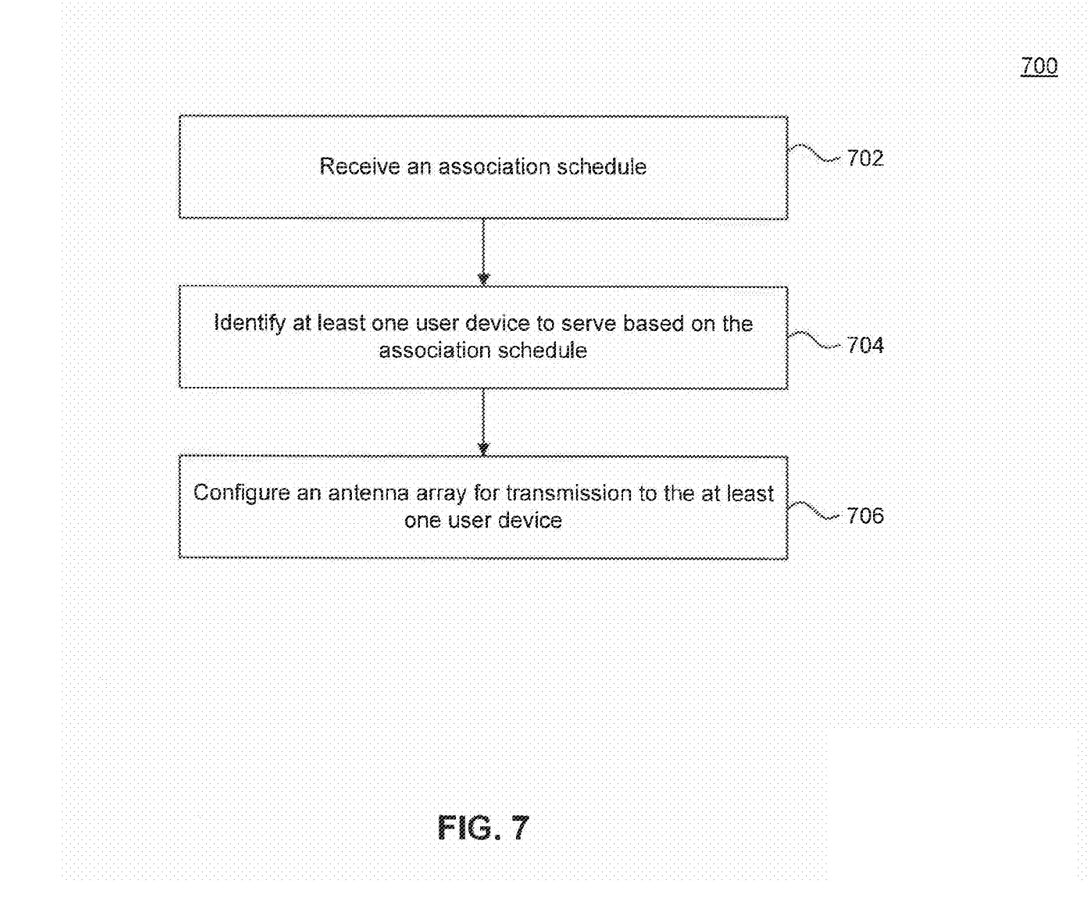
FIG. 7 illustrates another example process according to an embodiment.

FIG. 7 illustrates an example process 700 according to an embodiment. Example process 700 is provided for the purpose of illustration only and is not limiting of embodiments. Example process 700 can be performed by a base station having a M-MIMO antenna array, such as base station 102 or base station 104, for example, in example environment 200. In an embodiment, process 700 can be performed by a processor, such as processor 602 of example base station 600.

As shown in FIG. 7, process 700 begins in step 702, which includes receiving an association schedule. In an embodiment, the association schedule is received from a controller, such as controller 210, and indicates the user devices, if any, to be served by the base station. As such, in step 704, process 700 includes identifying at least one user device to serve based on the association schedule. For example, referring to example environment 200, step 704 may include base station 102 identifying user devices 110a and 110c as user devices to serve based on the association schedule.

Process 700 terminates in step 706, which includes configuring the M-MIMO antenna array for transmitting to the at least one user device. In an embodiment, step 706 further includes determining a channel estimate of a downlink channel from the base station to the at least one user device, selecting a subset of the M-MIMO antenna array, determining a transmit precoder (vector or matrix depending on whether one or more than one data streams are being transmitted) based on the selected subset of the M-MIMO antenna array and the channel estimate, applying the transmit precoder to at least one data stream for the at least one user device to generate a plurality of signals; and controlling the subset of the M-MIMO antenna array to transmit the plurality of signals to the at least one user device. In an embodiment, the transmit precoder is determined such that transmission of the plurality of signals by the subset of the M-MIMO antenna array results in the at least one data stream being beamformed to the at least one user device.

In another embodiment, step 704 further includes identifying a second user device based on the association schedule, the second user device served by another base station. Accordingly, step 706 further includes determining the transmit precoder based on the channel estimate from the base station to the at least one user device and a second channel estimate from the base station to the second user device, applying the transmit precoder to the at least one data stream for the at least one user device to generate a plurality of signals, and controlling the M-MIMO antenna array to transmit the plurality of signals. In an embodiment, the transmit precoder is determined such that transmission of the plurality signals by the M-MIMO antenna array results in the at least one data stream being beamformed to the at least one user device and a spatial null being created at the second user device due to the transmission.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments as other embodiments will be apparent to a person of skill in the art based on the teachings herein.

What is claimed is:

1. A system, comprising:
    first and second base stations; and
    a controller, communicatively coupled to the first and second base stations, configured to:
        monitor data traffic between the first and second base stations and a plurality of user devices;
        categorize the data traffic into a plurality of traffic categories based on a downlink burst size, wherein the plurality of traffic categories include a first category corresponding to first downlink communications between the first and second base stations and a first set of the plurality of user devices having an average downlink burst size below a first threshold and a second category corresponding to second downlink communications between the first and second base stations and a second set of the plurality of user devices having an average downlink burst size above a second threshold;
        generate an association schedule that indicates which of the first and second base stations is to serve each of the plurality of user devices based at least in part on the plurality of traffic categories; and
        configure at least one of the first and second base stations based on the association schedule.

2. The system of claim 1, wherein the association schedule associates the first set of the plurality of user devices with the first base station and the second set of the plurality of user devices with the second base station.

3. The system of claim 2, wherein the controller is further configured to configure the first base station to serve the first set of the plurality of user devices and to configure the second base station to serve the second set of the plurality of user devices.

4. The system of claim 2, wherein the controller is further configured to configure the first base station to use a first frame structure and to configure the second base station to use a second frame structure, wherein the first frame structure and the second frame structure are different.

5. The system of claim 4, wherein the first frame structure and the second frame structure include different amounts of setup/control overhead.

6. The system of claim 1, wherein the controller is further configured to
   determine capabilities of the first and second base stations; and
   generate the association schedule based at least in part on the capabilities of the first and second base stations.

7. The system of claim 6, wherein the controller is further configured to determine one or more of: presence or absence of a Massive Multiple Input Multiple Output (M-MIMO) antenna array at each of the first and second base stations; capacity of a backhaul connection at each of the first and second base stations; and latency of the backhaul connection at each of the first and second base stations.

8. The system of claim 1, wherein the controller is located in one of the first and second base stations.

9. A method, comprising:
   monitoring data traffic between first and second base stations and a plurality of user devices;
   categorizing the data traffic into a plurality of traffic categories based on a downlink burst size, wherein the plurality of traffic categories include a first category corresponding to first downlink communications between the first and second base stations and a first set of the plurality of user devices having an average downlink burst size below a first threshold and a second category corresponding to second downlink communications between the first and second base stations and a second set of the plurality of user devices having an average downlink burst size above a second threshold;
   generating an association schedule that indicates which of the first and second base stations is to serve each of the plurality of user devices based at least in part on the plurality of traffic categories; and
   configuring at least one of the first and second base stations based on the association schedule.

10. The method of claim 9, wherein the association schedule associates the first set of the plurality of user devices with the first base station and the second set of the plurality of user devices with the second base station.

11. The method of claim 9, wherein configuring at least one of the first and second base stations based on the association schedule comprises:
    configuring the first base station to serve the first set of the plurality of user devices; and
    configuring the second base station to serve the second set of the plurality of user devices.

12. The method of claim 9, further comprising:
    determining capabilities of the first and second base stations; and
    generating the association schedule based at least in part on the capabilities of the first and second base stations.

13. The method of claim 12, further comprising:
    determining one or more of: a presence or absence of a Massive Multiple Input Multiple Output (M-MIMO) antenna array at each of the first and second base stations; capacity of a backhaul connection at each of the first and second base stations; and latency of the backhaul connection at each of the first and second base stations.

14. A method, comprising:
    monitoring data traffic between first and second base stations and a plurality of user devices;
    categorizing the data traffic into a plurality of traffic categories based on a traffic property that corresponds to a downlink burst size;
    generating an association schedule between the first and second base stations and the plurality of user devices based at least in part on the plurality of traffic categories; and
    configuring at least one of the first and second base stations based on the association schedule,
    wherein the plurality of traffic categories include a first category corresponding to first downlink communications between the first and second base stations and a first set of the plurality of user devices having an average downlink burst size below a first threshold and a second category corresponding to second downlink communications between the first and second base stations and a second set of the plurality of user devices having an average downlink burst size above a second threshold.

15. The method of claim 14, wherein the association schedule associates the first set of the plurality of user devices with the first base station and the second set of the plurality of user devices with the second base station.

16. The method of claim 14, wherein configuring at least one of the first and second base stations based on the association schedule comprises:
    configuring the first base station to serve the first set of the plurality of user devices; and
    configuring the second base station to serve the second set of the plurality of user devices.

17. The method of claim 14, further comprising:
    determining capabilities of the first and second base stations; and
    generating the association schedule based at least in part on the capabilities of the first and second base stations.

18. The method of claim 17, further comprising:
    determining one or more of a presence or absence of a Massive Multiple Input Multiple Output (M-MIMO) antenna array at each of the first and second base stations; capacity of a backhaul connection at each of the first and second base stations; and latency of the backhaul connection at each of the first and second base stations.

19. The method of claim 14, wherein configuring at least one of the first and second base stations based on the association schedule comprises:
    configuring the first base station to use a first frame structure; and
    configuring the second base station to use a second frame structure,
    wherein the first frame structure and the second frame structure are different.

20. The method of claim 19, wherein the first frame structure and the second frame structure include different amounts of setup/control overhead.

* * * * *